United States Patent Office 3,106,776
Patented Oct. 15, 1963

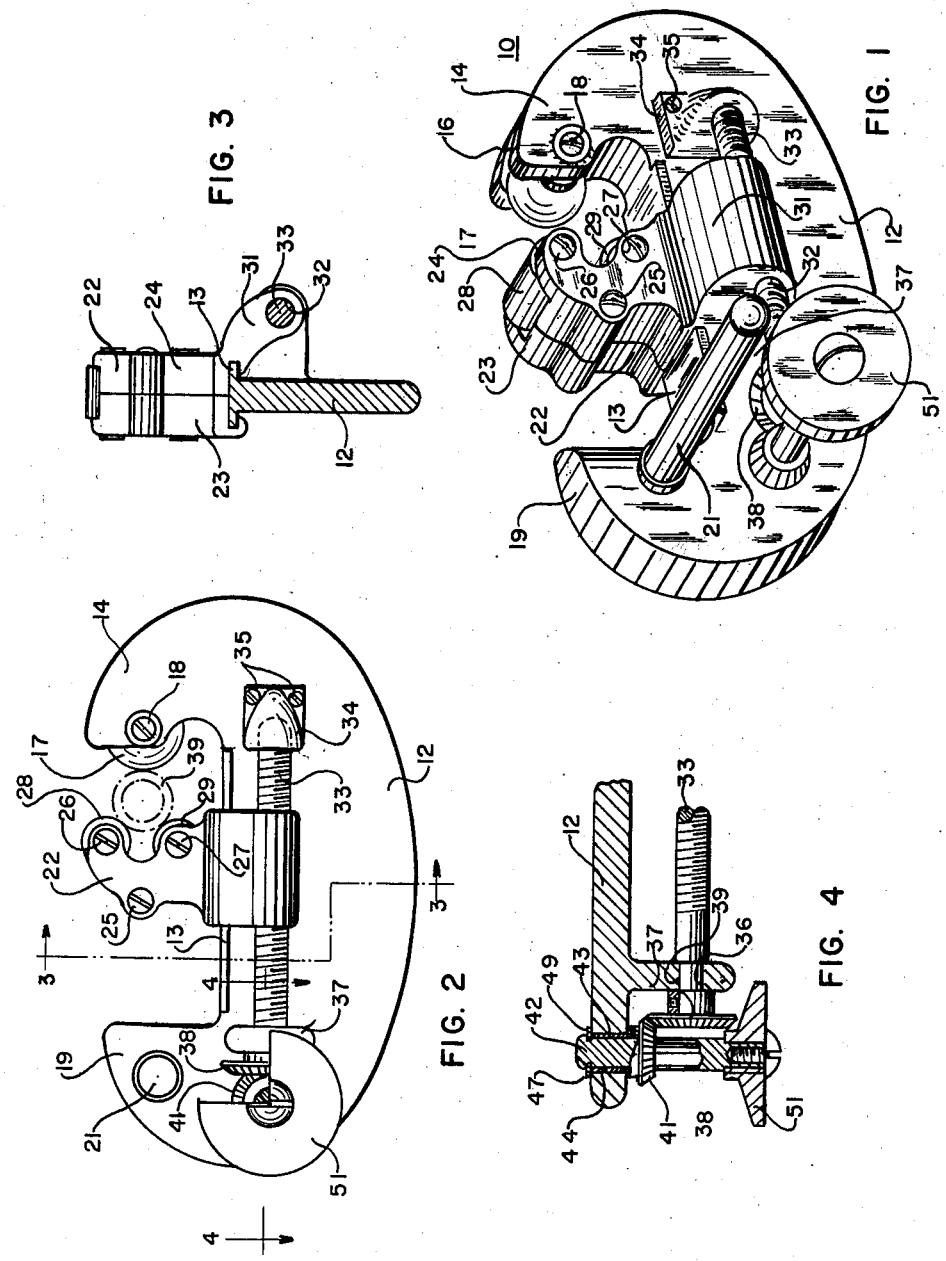

3,106,776
PIPE CUTTING TOOL
Paul J. Plas, Sycamore Township, Hamilton County, Ohio
(8432 Wicklow, Cincinnati 36, Ohio)
Filed Aug. 15, 1962, Ser. No. 217,037
3 Claims. (Cl. 30—102)

This invention relates to a device for cutting tubular articles such as a pipe and the like.

An object of this invention is to provide a pipe cutter which is compact in size and construction so that it can be used in a restricted location and for cutting lengths of pipe which are adjacent wall or studding members or the like.

A further object of this invention is to provide a pipe cutter of this type having a handle by means of which the cutter can be turned around a pipe while a cutter blade thereof cuts the pipe and having adjusting means adjacent the handle for adjusting the depth of cut so that the depth of cut can be adjusted while the pipe cutter is being turned without releasing of the handle.

A further object of this invention is to provide a pipe cutter of this type having a body, a carriage mounted thereon, the carriage supporting back-up rolls, the carriage being adapted to be advanced toward and away from a cutter wheel, a shaft rotatably mounted in the body, and threaded to the carriage, a handle mounted on the body, and means adjacent the handle for turning the threaded shaft to advance the back-up rolls toward and away from the cutter.

A further object of this invention is to provide a pipe cutter of this type in which the handle and means for turning the shaft are both parallel to the axis of a piece of pipe being cut thereby.

A further object of this invention is to provide a device of this type in which the shaft turning means is geared to the threaded shaft and the shaft turning means extends transversely of the shaft.

The above and other objects and features of the invention will be apparent to those skilled in the art to which this invention pertains from the following detailed description, and the drawing in which:

FIG. 1 is a perspective view showing a pipe cutting tool constructed in accordance with an embodiment of this invention;

FIG. 2 is a view in front elevation thereof, partly broken away and in section to reveal details of construction, a length of pipe being shown in association therewith;

FIG. 3 is a view in section taken on the line 3—3 in FIG. 2; and

FIG. 4 is a view in section taken on the line 4—4 in FIG. 2.

In the following detailed description and in the drawing, like reference characters indicate like parts.

In FIG. 1 is illustrated a pipe cutting tool 10 constructed in accordance with an embodiment of this invention. The tool 10 includes a body 12 having a track 13 extending therealong. An upwardly extending arm 14 of the body at one end of the track 13 is slotted as indicated at 16 in FIG. 1 to receive a cutter wheel 17 which is rotatably mounted on a cross shaft 18. A second upwardly extending arm 19 of the body at the opposite end of the track 13 carries a handle 21, which extends transversely of the track 13.

A carriage 22 is mounted on and moves lengthwise of the track 13. The carriage 22 includes sections 23 and 24 which are held together by bolts 25, 26 and 27. As shown most clearly in FIG. 2, the bolts 26 and 27 carry back-up rolls 28 and 29, which are rotatably mounted thereon. An arm 31 of the section 24 extends outwardly therefrom. A threaded bore 32 in the arm 31 receives a threaded shaft 33.

One end of the shaft 33 is received in a bearing block 34, which is attached to the body 12 by bolts 35. The other end of the shaft 33 extends through an opening 36 in a guide and back up arm 37 and carries a bevel gear 38 (FIG. 4). A shoulder 39 on the shaft 33 engages the arm 37 so that when the shaft 33 is turned, the carriage 22 is moved along the track 13 and the back-up rolls 28 and 29 can be held firmly against a side of a length of pipe 39 (see FIG. 2).

The bevel gear 38 meshes with another bevel gear 41 mounted on a cross-shaft 42. The cross-shaft 42 extends through a bearing sleeve 43 mounted in a transverse bore 44 in the body 12. A split ring 47 received in a circumferential groove 49 in the cross-shaft 42 holds the cross-shaft in position. A handle wheel 51 is mounted on the cross-shaft 42 and keyed thereto for turning the cross-shaft 42 and the threaded shaft 33 to advance the carriage to hold the back-up rolls 28 and 29 in engagement with the length of pipe 39 as shown most clearly in FIG. 2. The handle 21, by means of which the pipe cutter can be turned around the pipe 39, is closely spaced from the handle wheel 51 so that the handle wheel 51 can be turned with the fingers while the handle 21 is gripped, and it is unnecessary to release the handle 21 while adjusting the depth of cut by turning the handle wheel 51.

The pipe cutter illustrated in the drawing and described above is subject to structural modification without departing from the spirit and scope of the appended claims.

Having described by invention what I claim is new and desire to secure by Letters Patent is:

1. A pipe cutter which comprises a body, a track on the body extending lengthwise thereof, a carriage mounted on the track and advanceable lengthwise of the body, cooperating back-up means and cutter means mounted on the carriage and on the body adjacent one end of the track, a threaded shaft rotatably mounted on the body and extending lengthwise thereof and in threaded engagement with the carriage, a handle mounted on the body adjacent the other end of the track, a transverse shaft rotatably mounted on the body adjacent and parallel to the handle, and gear means connecting the transverse shaft to the threaded shaft to turn together, the pipe cutter being swingable around a pipe while the pipe is engaged between the cutter and the back-up rolls, the spacing between cutter and back-up rolls being adjustable by turning of the transverse shaft.

2. A pipe cutter which comprises a body, a track on the body extending lengthwise thereof, a carriage mounted on the track and advanceable lengthwise of the body, cutter means mounted on the body adjacent one end of the track, back-up means mounted on the carriage to cooperate with the cutter means for holding a pipe therebetween, a threaded shaft rotatably mounted on the body and extending lengthwise thereof and in threaded engagement with the carriage, a handle mounted on the body adjacent the other end of the track, a transverse shaft rotatably mounted on the body adjacent and parallel to the handle, and gear means connecting the transverse shaft to the threaded shaft to turn together, the pipe cutter being swingable around the pipe while the pipe is engaged between the cutter and the back-up rolls, the spacing between cutter and back-up rolls being adjustable by turning of the transverse shaft.

3. A pipe cutter which comprises a body, a track on the body extending lengthwise thereof, a carriage mounted on the track and advanceable lengthwise of the body, cooperating back-up means and cutter means mounted on the carriage and on the body adjacent one end of the track, a threaded shaft rotatably mounted on the body and extending lengthwise thereof and in threaded engagement with the carriage, a handle mounted on the body adjacent the other end of the track, a transverse shaft rotatably mounted on the body adjacent and parallel to the handle, and meshing bevel gears on the transverse shaft and the threaded shaft connecting the shafts to turn together, the pipe cutter being swingable around a pipe, while the pipe is engaged between the cutter and the back-up rolls, the spacing between cutter and back-up rolls being adjustable by turning of the transverse shaft.

No references cited.